June 2, 1959  A. I. CHAPMAN, JR  2,889,520
MOVING MAGNET METER MOVEMENT
Filed March 5, 1956  2 Sheets-Sheet 1

INVENTOR
Aubrey I. Chapman, Jr.

BY Stevens, Davis, Miller & Mosher
ATTORNEYS

June 2, 1959　　　A. I. CHAPMAN, JR　　　2,889,520
MOVING MAGNET METER MOVEMENT
Filed March 5, 1956　　　　2 Sheets-Sheet 2

INVENTOR
Aubrey I. Chapman, Jr.

BY Stevens, Davis, Miller and Mosher
ATTORNEYS

United States Patent Office 2,889,520
Patented June 2, 1959

2,889,520

MOVING MAGNET METER MOVEMENT

Aubrey I. Chapman, Jr., Dallas, Tex., assignor to Texas Instruments Incorporated, Dallas, Tex., a corporation of Delaware Application March 5, 1956, Serial No. 569,511

4 Claims. (Cl. 324—146)

This invention relates to a meter movement, and more specifically, to a moving magnet meter movement for use in connection with indicating instruments and recorders.

Moving magnet meter movements as such are not new, the first of this kind of meter movement having been known as the tangent galvanometer and described by Pouillet in 1837. The tangent galvanometer consists of a magnetic needle pivoted at the center of a narrow circular coil. In this type of galvanometer, the displacing torque results from the interaction of the field from the current in the coil with the field of the needle, and the opposing torque results from the action of the earth's magnetic field on the needle. The equilibrium position of the needle is along the resultant between the field of the coil and the horizontal component of the earth's field. The magnitude of the current may be determined from the equilibrium position of the needle, and from the knowledge of the coil constants and the magnitude of the horizontal component of the earth's field. Such a galvanometer is necessarily sensitive to variations in the local field resulting from the presence of magnetic materials in the neighborhood, or from current-carrying conductors near the galvanometer.

A moving magnet galvanometer resulted some years later as a logical development from the tangent galvanometer. As in the tangent galvanometer, the displacing torque results from the interaction of the field of the needle with that of the coils carrying the current to be measured, but in this instrument the magnetic needle is shielded from the action of local fields external to the current coils of the galvanometer. The restoring torque is supplied by the elastic properties of a fine quartz filament from which the moving magnet is suspended. The shielding, consisting of an iron cylinder or a series of coaxial cylinders enclosing the galvanometer, cannot be completely effective, so that the instrument is somewhat sensitive to local fields. Also, because of the small forces involved, the suspension is very delicate.

One form of moving magnet meter is disclosed in U.S. Patent No. 2,411,997, issued December 3, 1946, to Frederick G. Kelly. This particular form utilizes for the movement, a bar magnet provided with arcuate shoes of high permeability and low hysteresis material mounted on either end. By this arrangement a meter movement is obtained which substantially linearly deflects in proportion to the amount of flux in the magnetic path including the movement. Among the disadvantages of this meter movement are the necessity for machining and assembling the three pieces of the movement with precision and accuracy and the relatively low torque development of the movement.

In contrast to the moving magnet galvanometer, another well-known and widely used form of galvanometer is the moving coil galvanometer commonly known as the D'Arsonval galvanometer. In a moving coil galvanometer the current carrying element is in the form of a coil of one or more turns, usually rectangular in shape, and suspended so that it is free to turn about its vertical axis of symmetry. This coil is usually arranged to move in a uniform, radial, horizontal magnetic field in the air gap between the pole pieces and armature of a permanent magnet. To increase the sensitivity of this type of galvanometer, the current-carrying coil is free to move around a soft iron cylindrical core so that the flux path between the two shaped permanent magnet pole pieces is reduced to two very narrow air gaps. Although this meter movement may be made more sensitive by increasing the number of turns on the coil, this necessarily creates a higher inertia rotor which adversely affects the frequency response.

Fundamentally, the meter movement of the present invention consists of a permanent magnet in the form of a relatively thin flat circular disc supported in a radial air gap formed by two magnetically soft, shaped pole pieces. The two shaped pole pieces are connected by a continuous path also of magnetically soft material on which a coil of wire is wound and through which signals to the magnet are applied. As the field developed by the permanent magnet interacts with the field produced by signals applied to the coil, the circular permanent magnet deflects against a flat spiral spring which restores the magnet to the no-deflection position after the signal is removed. Thus, the meter movement is of the moving magnet type and was conceived to avoid the limitations of prior galvanometers while retaining the desirable features. It will be further evident that the meter movement of the present invention possesses distinct advantages over meter movements previously known and especially the form disclosed in U.S. Patent No. 2,411,997 in that the movement is composed essentially of a single piece which can be manufactured easily and inexpensively and the movement develops an unexpectedly relative large torque.

Accordingly, it is a principal object of this invention to produce a meter movement with an essentially linear relation between the torque developed and the current supplied by utilizing only the proper portion of the deflection range and by reason of the magnetic symmetry of the pole pieces.

It is another object of this invention to produce a highly sensitive meter movement due to the low ratio of rotor inertia to rotor torque and the freedom to use a large number of turns of low resistance wire in the signal coil since the signal coil forms no part of the rotor.

It is another object of this invention to eliminate the objections to earlier types of moving magnet meter movements by use of a rugged mounting system for the moving magnet and a more substantial restoring force.

Still another object of this invention is to reduce the influence of the earth's magnetic field on the moving magnet by the provision of soft iron pole pieces surrounding the moving magnet.

The above objects will be more clearly understood and other objects made apparent when taken in conjunction with the following discussion and description of the drawing in which.

Figure 1:
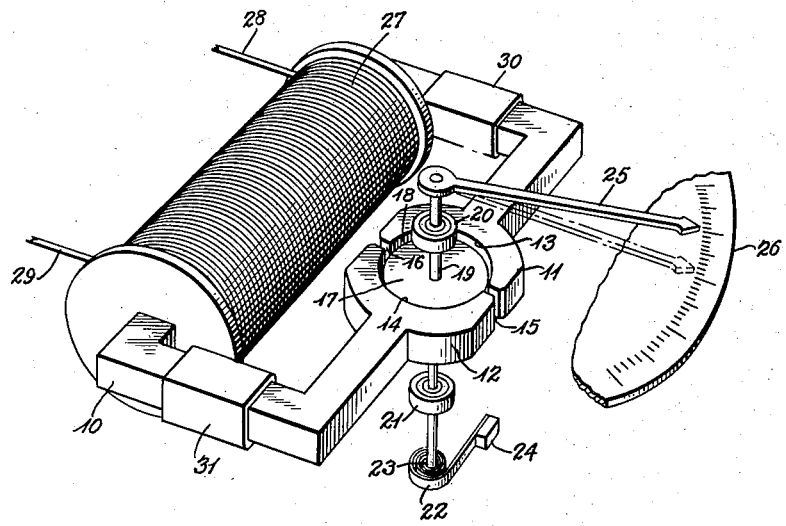
Figure 1 is a view in perspective showing the basic components of the meter movement.
Figure 2:
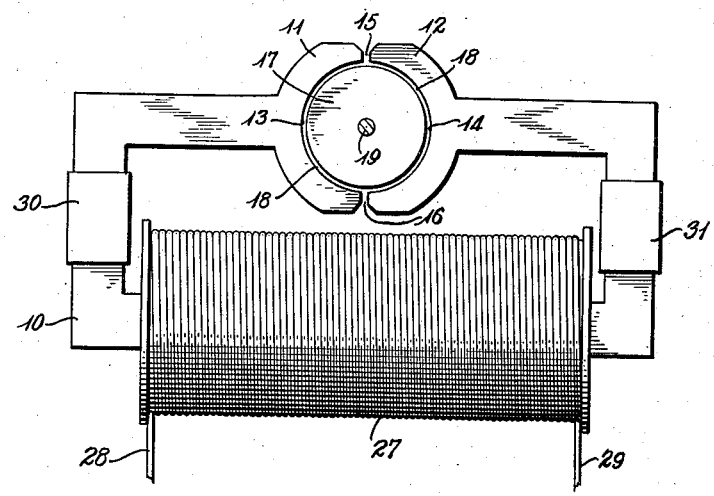
Figure 2 is a plan view of the meter movement showing principally the position of the moving magnet in relation to the shaped pole pieces.

Referring now to Figures 1 and 2 of the drawings, the meter movement consists of two pole pieces 11 and 12, approximately semicircular in shape, positioned to face each other but separated by air gaps 15 and 16. When thus positioned, surfaces 13 and 14 of pole pieces 11 and 12 respectively form an open cylindrical area with a radius equal to the radius of semicircular surface 13 or surface 14 and a length equal to the thickness of either pole piece section. Pole pieces 11 and 12 are integrally connected to and occupy the mid-portion of one long leg of the rectangularly shaped magnetic path 10. A signal coil 27 is wrapped around the other long leg of the rectangular magnetic path 10 and signals to operate the meter movement are applied to signal coil 27 through leads 28 and 29. Damping coils 30 and 31, as shown in Figures 1 and 2, each consist of a heavy copper band fitted around a short leg of the rectangular magnetic path to produce the effect of a shorted winding.

Within the cylindrical open area formed by the semicircular pole pieces 11 and 12 is located the permanent magnet circular disc rotor 17 magnetized across one diameter. Rotor 17 is so supported between the pole pieces as to leave a radial air gap 18 of uniform width between the rotor and surfaces 13 and 14 of the pole pieces. Rotor 17 is fixed to shaft 19 and supported between the pole pieces by means of ball bearings 20 and 21 with the inner races of the ball bearings fixed to shaft 19 and the outer races of the ball bearings fixed to a framework not shown. The permanent magnet deflects against the restoring force provided by flat spiral spring 22 which is connected to shaft 19 at point 23 by any suitable means and to a portion of the meter frame 24. An indicating needle 25 is mounted at the upper end of shaft 19 and indicates the quantity being measured on a suitably calibrated scale 26.

Figure 3:
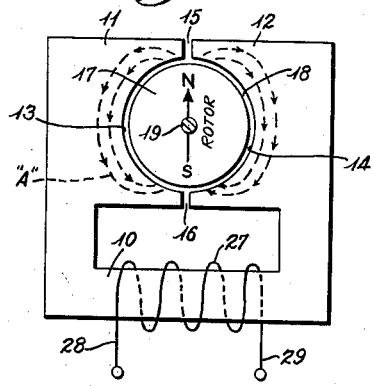
Figure 3 is a schematic representation of the flux in the meter movement with no signal applied to the coil.
Figure 4:
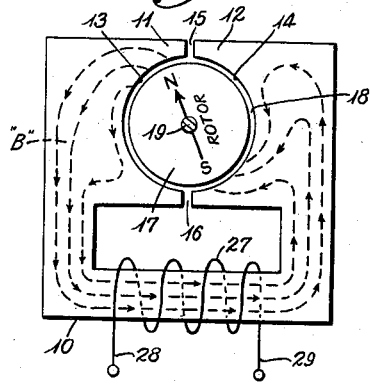
Figure 4 is a schematic representation of the flux in the meter movement with a signal applied to the signal coil.

To explain the operation of the meter movement, reference is made to the schematic representations of the flux paths in the meter movement as shown in Figures 3 and 4. In the no-signal condition of Figure 3, rotor 17 is shown with its north-south direction of magnetization in alignment with the air gaps 15 and 16. Such alignment is desirable, but not necessary, when the meter is to be of the type to indicate currents of either polarity in order that its zero-center scale position will be at the mid-point of the linear range of the movement. A different alignment may be more desirable for other types of indication such as, for example, zero-end scale for currents of only one polarity. The restoring spring 22 is used to index the rotor in this position since, due to the symmetry of the magnetic path, there are no magnetic forces tending to orient the magnet in any given direction. Also, because of the shape of the pole pieces, the rotor is in effect supported in the center of an infinite plate of magnetic material and subject to receiving the signal flux equally from all directions. Consequently, the width or the configuration of air gaps 15 and 16 in relation to the radial air gap 18 is such as to direct the flux from the magnet in the no-signal position along the path indicated by the letter A in Figure 3. Thus, the flux leaves the north pole of the rotor across air gap 18 in two separate paths on either side of air gap 15 and returns at the south pole across air gap 18 along paths on either side of air gap 16.

As an electric signal is applied to coil 27, a flux is generated which follows the path B shown in Figure 4. The flux generated by signal coil 27 is directed along magnetic path 10 to pole piece 12 and crosses air gap 18 to rotor 17 along the semicircular surface 14. When the signal flux is comparatively low, the flux path taken will be approximately that shown by path "B" in Figure 4 with the rotor deflected against the action of spring 22 to line up with the flux path across the magnet. However, for higher values of flux, the flux will be distributed more evenly across radial air gap 18 along the semicircular surface 14 and rotor 17 will be turned through an angle approaching 90° from its no-signal position. As the rotor deflects in response to a signal and is returned by the restoring spring when the signal is removed, the rotor will swing past its no-signal position and induce a flux acting in the opposite direction. The heavy damping coils 30 and 31 pick up the induced signal and dissipate the energy to allow the rotor to settle in the no-signal position with very little oscillation. It is, of course, apparent that the above description is applicable to a deflection of the rotor in either direction in response to a given signal.

Due to the use of a permanent magnet with a low inertia-torque ratio as compared with other meter movement rotors, it can be seen that rotor 17 will respond very quickly to small signals applied to the signal coil. Further, since the signal coil is no longer a part of the rotor, the wire size and number of turns of the signal coil can be increased to provide a low resistance coil with a high sensitivity.

Figure 5:
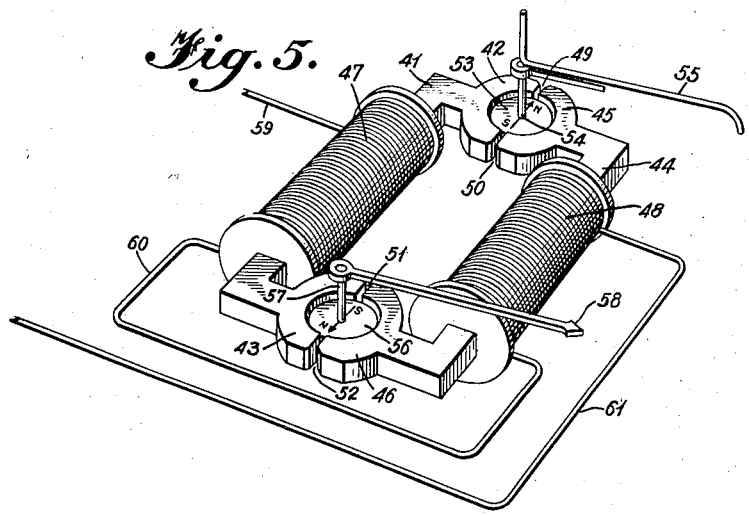
Figure 5 shows a modification of the basic embodiment of the invention.

In Figure 5, the basic meter movement of Figures 1 and 2 is shown modified into a dual meter movement. The completed magnetic path retains its essentially rectangular shape but in this modification is composed of two identical halves. One half consists of semicircular pole pieces 42 and 43 joined by the soft iron magnetic path 41 and the other identical half consists of semicircular pole pieces 45 and 46 joined by the soft iron magnetic path 44. The two halves are so supported that pole pieces 42 and 45 are opposite each other but separated by gaps 49 and 50 and similarly, pole pieces 43 and 46 are opposite each other but separated by air gaps 51 and 52. Permanent magnet circular disc rotors 53 and 56 are mounted in the open cylindrical areas formed by the pairs of pole pieces 42 and 45 and 43 and 46 respectively. Circular disc 53 is supported by shaft 54 and mounts a tubular pen 55 suitable for recording while circular disc 56 is supported by shaft 57 and mounts an indicating needle 58.

Two signal coils are used in the operation of this device, signal coil 47 wound on leg 41 and signal coil 48 wound on leg 44. The signal coils are connected in series by a lead 60 and the signal to be measured is applied between leads 59 and 61 with lead 59 connected to coil 47 and lead 61 connected to coil 48. It can be seen that this arrangement is capable of indicating and recording a given signal simultaneously although the additional structure necessary for this purpose is not shown in the drawing. This is not deemed necessary, however, since recorder and indicating meter structures are well-known in the art. One feature to be borne in mind in this arrangement is that the same signal may be used to turn recording pen 55 and indicating needle 58 in the same direction or in opposite directions, the sole criterion depending upon the direction of orientation of the rotors relative to each other in their respective cylindrical air gaps. Further, although the recording pen and indicating needle in this instance are shown positioned at right angles to the direction of magnetization of the rotors because of the desirability of placing the rotor with its direction of magnetization in alignment with the air gaps separating the semicircular pole pieces as explained above, such positioning is not necessary.

Figure 6:
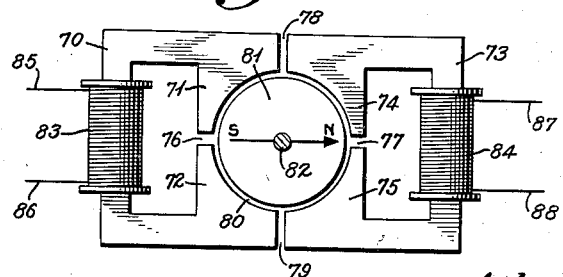
Figure 6 shows a further modification of the basic embodiment of the invention.

In another modification as shown in Figure 6, it is possible to construct a meter movement following the principles of this invention which can be used to indicate the algebraic sum of two different signals. In this device, the permanent magnet circular rotor 81 is supported by shaft 82 in a cylindrical air gap formed by pole pieces 71, 72, 74, and 75, each of the pole pieces shaped to provide a 90° segmental arc of the air gap. Pole pieces 71 and 72 are part of one circuit which is completed by the magnetic path 70 and the pole pieces 74 and 75 are part of the circuit completed by the magnetic path 73. Each of the respective pole pieces are separated from each other by the air gaps 76, 77, 78, and 79. As in the case of the meter movement of Figures 1 and 2, rotor 81 is separated from each of the pole pieces by a radial air gap 80. Signal coil 83, wound on path 70, is supplied with signals through leads 85 and 86 and signal coil 84, wound on path 73, is supplied with signals through leads 87 and 88. The north-south direction of magnetization of the circular permanent magnet 81 is in alignment with the air gaps 76 and 77 in order that the flux produced by the signal coils can attract or repel a magnetized pole of the rotor and cause it to deflect. As stated above, this arrangement is suitable for taking the sum of a signal applied to each signal coil or indicating the difference between the signals applied to each coil.

While only the basic form of this invention and two modificaitons have been shown, it is apparent that numerous modifications, variations, and changes can be made without departing from the scope of the invention. For example, one such change that could be made is to change the shape of the rectangular magnetic path into a circular magnetic path. Therefore, it is the intent of the invention to claim any modifications or changes which can be made to the invention as shown without departing from the scope of the invention as defined by the appended claims.

What is claimed is:

1. A meter movement of the moving magnet type comprising core means terminating in field poles having arcuate pole faces curved about a common center line and separated by narrow air gaps at their adjacent peripheral edges, a coil associated with said core for producing a magnetic field between said field poles, and a circular disc magnetic member concentrically mounted for pivotal movement between said pole faces with the pivotal axis of said member coincident with said common center line and separated from said pole faces by narrow radial air gaps, said magnetic member consisting of a disc magnetized parallel with a diameter, said circular disc exhibiting linear rotational response to changes in the magnetic field produced by said coil, despite the non-uniform flux distribution along the periphery of said circular disc produced by the magnetization of said circular disc parallel with a diameter.

2. A meter of the moving magnet type comprising a magnetic core structure terminating in a plurality of field poles each having an arcuate pole face, said pole faces being curved about a center line common to all and, being separated from each other by narrow air gaps at their adjacent peripheral edges, a coil associated with said magnetic core structure for producing a magnetic field between said pole faces, a permanent magnet rotor consisting of a circular disc magnetized parallel with a diameter located between said pole faces and separated from said pole faces by radial air gaps, a rod coaxially fixed to said rotor, and bearing means holding said rod for free rotation with its axis along the center line of curvature of said pole faces.

3. A meter of the moving magnet type comprising two U-shaped magnetic core structures arranged to form a substantially closed magnetic path, each said core structure terminating in opposite field poles each having an arcuate pole face, with the field poles of the two core structures cooperating to define two pairs of arcuate pole faces, each pair of arcuate pole faces being curved about a common center line and being separated from each other by narrow air gaps at their adjacent peripheral edges, a coil associated with at least one of said magnetic core structures for producing a magnetic field between said pairs of pole faces, a permanent magnet rotor consisting of a circular disc magnetized parallel with a diameter located between the pole faces of each said pair and separated therefrom by radial air gaps, a rod coaxially fixed to each said rotor, and bearing means holding each said rod for free rotation with its axis along the center line of curvature of the respective pair of pole faces associated therewith.

4. A meter of the moving magnet type comprising two closed path magnetic core structures arranged in the same plane in side by side relation and separated by air gaps, the adjacent portions of said core structures each being split to define an air gap with the regions of the adjacent portions lying between air gaps constituting field poles, each said field pole defining an arcuate pole face that extends for approximately 90 degrees, the said arcuate pole faces all being curved about a common center line, a coil associated with each said core structure for producing a magnetic field between said field poles, a permanent magnet rotor consisting of a circular disc magnetized parallel with a diameter located concentrically within said arcuate pole faces and separated from said arcuate pole faces by radial air gaps, a rod coaxially fixed to said rotor, and bearing means holding said rod for free rotation with its axis along the said common center line of said arcuate pole faces.

References Cited in the file of this patent

UNITED STATES PATENTS

| | | |
|---|---|---|
| 2,411,997 | Kelly | Dec. 3, 1946 |
| 2,486,972 | Osterlund | Nov. 1, 1949 |